Patented July 27, 1943

2,325,172

UNITED STATES PATENT OFFICE 2,325,172

SANDPAPER MANUFACTURE

Joseph N. Borglin, Wilmington, Del., assignor to Hercules Powder Company, Wilmington, Del., a corporation of Delaware No Drawing. Application January 20, 1942, Serial No. 427,447

14 Claims. (Cl. 51—301)

This invention relates to improved sheet abrasive products and methods of manufacturing the same; more particularly, it relates to cellulosic sheet materials having an abrasive surface and commonly referred to as sandpaper.

It is common practice in the manufacture of sandpaper to secure the abrasive grains to the surface of the paper with a proteinaceous glue such as ordinary animal glue. The resulting product can be used successfully for sanding plane surfaces, however, much trouble is encountered where an attempt is made to bend or crumple the paper so that it may be used on highly curved and irregular surfaces. Due to inflexibility, the coating cracks and the sharp, jagged edges make it difficult to secure a smooth surface. Furthermore, after these glue coated papers have been used for a short time, they tend to "gum up." This gumming of the paper is caused by the inability of the glue coating to hold the abrasive grains intact under conditions of use, also by the ability of the coating to pick up the wood dust. These glue coated papers also suffer from lack of water resistance since the glues employed are either water-soluble or water-dispersible. A further detriment to the use of these glue coated papers is found in the fact that they have poor aging qualities. This is generally attributed to breakdown of the glue binder itself as a consequence of bacterial action.

Now, in accordance with this invention, it has been found that a much improved sheet abrasive product may be made by employing as the coating for the cellulosic sheet material a composition comprising essentially a proteinaceous adhesive in conjunction with either polymerized rosin or a water-soluble salt of polymerized rosin.

In the preparation of these new sheet abrasive products, somewhat different procedures are employed depending upon whether polymerized rosin or a water-soluble salt of polymerized rosin is employed in the composition. Where a water-soluble salt of polymerized rosin is employed, it will be admixed with an aqueous solution or dispersion of the desired proteinaceous adhesive until a homogeneous mass is obtained. The most desirable procedure is to prepare an aqueous solution of the salt of polymerized rosin and admix the same with the aqueous proteinaceous adhesive solution or dispersion. Where polymerized rosin is employed, it will first be dissolved in a water-miscible organic solvent, as ethyl alcohol, prior to admixing with the aqueous proteinaceous adhesive solution or dispersion. The resulting aqueous porteinaceous adhesive-polymerized rosin composition or aqueous proteinaceous adhesive-polymerized rosin salt composition will be applied to cellulosic sheet material by any desirable means as by roller coating, etc. Thereafter, abrasive grains such as garnet grains will be applied and the coating finally dried. If desired, an additional or size coat of coating composition may be applied.

As illustrative of various methods of carrying out the invention, several particular embodiments are given below. These, however, are in no way to be considered as limiting the invention, but are merely illustrating the inventive concept which is broadly set forth in the specification and claims. All parts and percentages are by weight unless otherwise indicated.

Example 1

The following raw material formula was employed:

| | Parts |
|---|---|
| Polymerized rosin (drop M. P. 100° C.) | 2,000 |
| Ethyl alcohol | 920 |
| Aqueous ammonia (28%) | 370 |

The polymerized rosin was melted and dissolved in the alcohol. The aqueous ammonia was added and the ingredients stirred until a smooth solution resulted. To this solution 9360 parts of an aqueous 20% animal glue solution were added. The temperature of the animal glue solution at the time of the addition was 150° F. After thoroughly admixing, the resulting homogeneous composition was heated to 110° F. and then applied by means of a roller coating mechanism to sheets of paper backing, 24" x 36" and about 25 mils thick. Thereafter, abrasive particles were applied to the coated sheets. The coating composition was then diluted with water to 50% of its former solids content, and a top-coat was applied using this diluted composition. The coated sheets were finally dried at 74° F. for a period of 2 days.

The dried sandpaper had excellent waterproof properties; hence, it could be used successfully in wet-sanding operations. It was quite flexible as compared with a sandpaper prepared using a straight animal glue coating. The paper was so flexible that it could be bent and used on curved and irregular surfaces without cracking and thereby marring the sanded surfaces. The dried adhesive coating had a definitely higher melting or softening point than that of the straight animal glue coating. Consequently, the sandpaper could be used for a much longer time without its gumming up and destroying the effectiveness of the abrasive particles. The adhesive coating held the abrasive grains firmly in place. This contributed to the excellent working characteristics of the paper and freedom from any tendency to "gum up." These sandpapers were observed over a period of 16 months for aging characteristics. It was found that they suffered no noticeable deterioration due to age and particularly were free from any bacterial decomposition which normally attends the use of straight animal glue in this art.

*Example 2*

The following raw material formulation was employed:

| | Parts |
|---|---|
| Polymerized rosin (drop M. P. 100° C.) | 35 |
| Ethyl alcohol | 16 |
| Aqueous ammonia (28%) | 22 |
| Water | 100 |
| Animal glue | 35 |

The polymerized rosin was first melted and the melt dissolved in the ethyl alcohol. The aqueous ammonia was then stirred in, and the water was slowly added. A clear solution resulted. This solution was slowly added with constant agitation to the animal glue. The mixture was then gently heated on a steam bath at a temperature below 50° C. with slow agitation until a homogeneous solution resulted. This coating composition was applied to sheets of paper and sprinkled with abrasive particles in the same manner as that employed in Example 1. The completely dried sandpapers resulting were found to have excellent water-resisting properties, good flexibility and were free from any serious tendencies to "gum up" under conditions of actual use. Generally, these sandpapers were quite similar to those obtained in accordance with the procedure of Example 1.

*Example 3*

The following raw material formula was used:

| | Parts |
|---|---|
| Animal glue | 25 |
| Water | 86 |
| Polymerized rosin (drop M. P. 100° C.) | 25 |
| Ethyl alcohol | 25 |

The polymerized rosin was dissolved in the ethyl alcohol, and the resulting solution added to a solution obtained by heating the animal glue and water at a temperature below 50° C. A homogeneous composition resulted which upon application to sheets of paper by the method described hereinbefore gave very smoothly coated sheets. Abrasive particles were applied to the same, and the sheets were then dried for a period of 2 days at 74° F. As compared with straight animal glue coated sandpapers, these new sandpapers were much more flexible and hence could be employed in sanding curved and irregular surfaces with much greater success. The sandpapers did not show any objectionable tendency to "gum up" during use.

*Example 4*

The following raw material formula was used:

| | Parts |
|---|---|
| Polymerized rosin (drop M. P. 100° C.) | 150 |
| Water | 85 |
| Casein | 10 |
| Aqueous sodium hydroxide (20%) | 10 |
| Aqueous ammonia (28%) | 5 |

A casein adhesive was prepared by wetting the casein with the water and then stirring in the aqueous ammonia. There resulted a clear adhesive solution. The polymerized rosin was then melted and while holding the temperature at 105° C. to 110° C., the sodium hydroxide solution was slowly added with vigorous agitation. The casein solution was then added, and all the ingredients were agitated to yield a homogeneous composition. This was applied to sheets of paper backing by a roller coating method similar to that of Example 1. Abrasive grains were applied and the papers were dried at 30° C. over a period of 24 hours. The finished sandpapers had characteristics very similar to those resulting from Example 1. It was particularly noted that the sandpapers resulting from this example showed no noticeable deterioration upon aging for a period of 12 months.

*Example 5*

The following raw material formula was employed:

| | Parts |
|---|---|
| Blood albumen | 40 |
| Casein | 12 |
| Calcium hydroxide | 6 |
| Sodium fluosilicate | 2 |
| Polymerized rosin (drop M. P. 100° C.) | 30.5 |
| Ethyl alcohol | 14 |
| Aqueous ammonia (28%) | 5.5 |

A casein-blood albumen adhesive was prepared by stirring the casein with 80 parts of water until it was thoroughly wet, then slowly adding the calcium hydroxide and continuing agitation until a smooth solution resulted. The blood albumen was then added, followed by the sodium fluosilicate. An aqueous solution of the ammonium salt of the polymerized rosin was then prepared by first dissolving the polymerized rosin in the ethyl alcohol and then adding the aqueous ammonia. To the resulting solution was added the previously prepared casein adhesive. A fluid adhesive composition resulted which was utilized in making sandpaper in accordance with the procedure set forth in Example 1. The resulting sandpapers had excellent water-resistant characteristics and as with the products of Example 1 were found to possess excellent flexibility characteristics and to be free of any tendency to "gum up" in use.

In general, the polymerized rosins contemplated for use in accordance with this invention may be those derived from any of the various grades of wood or gum rosin. It is contemplated, too, that the various polymerized rosin acids obtainable from the aforesaid rosins be included as equivalents. These acids comprise abietic, pimaric, sapinic, sylvic, etc. acids, or mixtures thereof. Polymerization may be carried out by various methods, such as, for example, by treatment with various catalysts, as sulfuric acid, boron trifluoride, stannic chloride, zinc chloride, aluminum chloride, hydrofluoric acid, etc. or by treatment of the rosin with a high voltage, high frequency discharge, or by treatment with an acid sludge formed by treatment of rosin with sulfuric acid. The polymerization of rosin by any of these methods is usually carried out with the rosin dissolved in some suitable organic solvent, such as, benzene, gasoline, etc.

The polymerized rosins contemplated for use in accordance with this invention are characterized by having a melting point by the Hercules drop method of at least 85° C., preferably between about 90° C. and about 135° C. Polymerized rosins having a drop melting point of from about 135° C. to about 176° C. are obtained by reduced pressure distillation of products resulting from the treatment of ordinary rosin with one of the aforesaid polymerization catalysts. In this way the unpolymerized portion of the rosin is either wholly or partially removed.

As stated hereinbefore and illustrated by the examples, a water-soluble salt of polymerized rosin may be employed in the coating composition. Of all the water-soluble salts of polymerized rosin, the ammonium and alkali metal salts, i. e., the sodium, potassium and lithium salts, are preferably employed, with the ammonium salt being particularly preferred inasmuch as sandpapers prepared using an adhesive composition containing this salt appear to have the best aging characteristics and resistance to bacterial action. The various water-soluble salts of polymerized rosin may be prepared by any suitable method, as heating the polymerized rosin to an elevated temperature, say within the range of from about 150° C. to about 315° C., and then adding the acetate, oxide, hydroxide, or other reactive compound of a metal which forms a water-soluble salt of polymerized rosin. Another method of preparing the water-soluble salt is to first dissolve the polymerized rosin in a solvent such as ethyl alcohol and then add thereto the acetate, oxide, hydroxide or other reactive compound of a metal whose polymerized rosin salt is water-soluble.

It has been demonstrated by the examples that many different proteinaceous adhesives or glues may be employed in accordance with the present concept. Thus, animal proteinaceous adhesives, such as, animal glue, blood albumen glue, casein glue, fish glue, isinglass, bone glue, cartilage glue, skin glue, etc. may be used; also vegetable proteinaceous adhesives, such as, adhesives prepared from zein, adhesives prepared from soybean protein, etc. may be used.

It should be realized that in the use of the preceding glues and adhesives, there is contemplated the compositions generally recognized in the art as such. Thus, casein glue, for example, is the product of the treatment of casein with an inorganic base. Usually a combination of Ca(OH)$_2$ and NaOH is used, however, other bases may be employed, such as NH$_4$OH, etc. Similarly, zein adhesive is prepared by treating zein with an inorganic base, such as, NH$_4$OH, etc.; soybean protein adhesive may be prepared in a similar manner. It will be evident therefore that these various proteinaceous glues and adhesives have varying compositions as the terms are used in the art, and that it is the intent that the present processes encompass all these various modifications.

As illustrated in Example 3, the preferred procedure, when polymerized rosin is employed, is to dissolve the same in ethyl alcohol and add the resulting solution to an aqueous solution of a proteinaceous adhesive. Other water-miscible solvents for the polymerized rosin may be employed, as monohydric alcohols of between 1 and 8 carbon atoms, as methanol, ethanol, propanol, etc.; polyhydric alcohols, as ethylene glycol, propylene glycol, glycerol, etc. In preparing a liquid coating composition utilizing a water-soluble salt of polymerized rosin, said salt either in solid form or in solution in water or a water-miscible solvent will be added to an aqueous solution of any desired proteinaceous adhesive and the ingredients will be agitated until homogeneity is produced.

The proportions of the various ingredients employed in accordance with this invention will be such that up to about 70% by weight, and preferably between 40% and about 60% by weight, of the dried coating composition will be either polymerized rosin or a water-soluble salt of polymerized rosin. Up to 5% by weight of the dried coating composition may comprise some stabilizing or modifying agent, such as, trisodium phosphate, beta-naphthol, glycerin, tricresyl phosphate, etc. The remainder of the dried coating composition will consist of the particular proteinaceous adhesive desired.

The sheet abrasive products prepared in accordance with this invention present advantages over the prior art products. Sandpaper prepared in accordance with the present processes has been shown to possess much better flexibility enabling crumpling of the paper and bending the same such that it can be more successfully used on surfaces other than plane surfaces. At the same time there has been obtained a definite improvement in the tendency to "gum up" under conditions of actual use. These novel sandpapers can, for this reason, be used longer than the prior art products. Also they can be used at somewhat higher temperatures since the melting or softening points of the coating compositions herein described are much higher than those of the straight animal glue coatings which have been used heretofore. These novel sheet abrasive products are also interesting inasmuch as they provide superior water resistance as compared with prior art products and have excellent resistance to bacterial and other decomposition with age.

What I claim and desire to protect by Letters Patent is:

1. An abrasive product comprising a backing of cellulosic sheet material having a coating thereon comprising essentially a proteinaceous adhesive and a material selected from the group consisting of polymerized rosin and water-soluble salts of polymerized rosin, with abrasive grains embedded in said coating.

2. An abrasive product comprising a backing of cellulosic sheet material having a coating thereon comprising essentially an animal proteinaceous adhesive and a material selected from the group consisting of polymerized rosin and water-soluble salts of polymerized rosin, with abrasive grains embedded in said coating.

3. An abrasive product comprising a backing of cellulosic sheet material having a coating thereon comprising essentially a vegetable proteinaceous adhesive and a material selected from the group consisting of polymerized rosin and water-soluble salts of polymerized rosin, with abrasive grains embedded in said coating.

4. An abrasive product comprising a backing of cellulosic sheet material having a coating thereon comprising essentially an animal proteinaceous adhesive and polymerized rosin, with abrasive grains embedded in said coating.

5. An abrasive product comprising a backing of cellulosic sheet material having a coating thereon comprising essentially an animal proteinaceous adhesive and a water-soluble salt of polymerized rosin, with abrasive grains embedded in said coating.

6. An abrasive product comprising a backing of cellulosic sheet material having a coating thereon comprising essentially an animal proteinaceous adhesive and a polymerized rosin having a drop melting point of at least 85° C., with abrasive grains embedded in said coating.

7. An abrasive product comprising a backing of cellulosic sheet material having a coating thereon comprising essentially an animal proteinaceous adhesive and polymerized rosin having a melting point between about 85° C. and about 135° C., with abrasive grains embedded in said coating.

8. An abrasive product comprising a backing of cellulosic sheet material having a coating thereon comprising essentially an animal glue and polymerized rosin having a melting point between about 85° C. and about 135° C., with abrasive grains embedded in said coating.

9. An abrasive product comprising a backing of cellulosic sheet material having a coating thereon comprising essentially polymerized rosin having a drop melting point between about 85° C. and about 135° C. in an amount between about 40% and about 60% by weight and animal glue, with abrasive grains embedded in said coating.

10. An abrasive product comprising a backing of cellulosic sheet material having a coating thereon comprising essentially an animal proteinaceous adhesive and a water-soluble salt of polymerized rosin having a drop melting point between about 85° C. and about 135° C., with abrasive grains embedded in said coating.

11. An abrasive product comprising a backing of cellulosic sheet material having a coating thereon comprising essentially an animal glue and a water-soluble salt of polymerized rosin having a drop melting point between about 85° C. and about 135° C., with abrasive grains embedded in said coating.

12. An abrasive product comprising a backing of cellulosic sheet material having a coating thereon comprising essentially a casein glue and a salt of polymerized rosin having a drop melting point between about 85° C. and about 135° C., with abrasive grains embedded in said coating.

13. An abrasive product comprising a backing of cellulosic sheet material having a coating thereon comprising essentially a water-soluble salt of polymerized rosin having a drop melting point between about 85° C. and about 135° C. in an amount between about 40% and about 60% by weight and animal glue, with abrasive grains embedded in said coating.

14. An abrasive product comprising a backing of cellulosic sheet material having a coating thereon comprising essentially a water-soluble salt of polymerized rosin having a drop melting point between about 85° C. and about 135° C. in an amount between about 40% and about 60% by weight and casein glue, with abrasive grains embedded in said coating.

JOSEPH N. BORGLIN.